(12) United States Patent
Blase et al.

(10) Patent No.: US 6,170,249 B1
(45) Date of Patent: Jan. 9, 2001

(54) ENERGY-SUPPLY CHAIN

(75) Inventors: Gunter Blase, Bergisch Gladbach; Kurt Fischer, Hennef, both of (DE)

(73) Assignee: Igus Spritzgubbteile fur die Industrie GmbH (DE)

( * ) Notice: Under 35 U.S.C. 154(b), the term of this patent shall be extended for 0 days.

(21) Appl. No.: 09/331,530

(22) PCT Filed: Dec. 9, 1997

(86) PCT No.: PCT/DE97/02863

§ 371 Date: Oct. 1, 1999

§ 102(e) Date: Oct. 1, 1999

(87) PCT Pub. No.: WO98/28556

PCT Pub. Date: Jul. 2, 1998

(30) Foreign Application Priority Data

Dec. 23, 1996 (DE) .......................................... 296 22 349 U
Apr. 14, 1997 (DE) .............................................. 197 15 532

(51) Int. Cl.[7] ................................................... F16G 13/16
(52) U.S. Cl. ................................ 59/78.1; 59/900; 248/49; 248/75
(58) Field of Search .............................. 59/78.1; 248/49, 248/51, 75

(56) References Cited

U.S. PATENT DOCUMENTS 3,779,003 * 12/1973 Boissevain et al. ................... 59/78.1

FOREIGN PATENT DOCUMENTS

| 3531066 | * | 3/1987 | (DE) | ...................................... 59/78.1 |
| 3730586 | * | 11/1988 | (DE) | ...................................... 59/78.1 |
| 3909797 | * | 4/1990 | (DE) | ...................................... 59/78.1 |
| 60-008543 | * | 1/1985 | (JP) | ...................................... 59/78.1 |

* cited by examiner

Primary Examiner—David B. Jones
(74) Attorney, Agent, or Firm—Reising, Ethington, Barnes, Kesselle, Learman & McCulloch, P.C.

(57) ABSTRACT

An energy guiding chain is disclosed for accommodating cables and hoses. The chain has laterally spaced parallel side-plates (1) with upper and lower cross-members (2,3). A cross-sectional space for said cables and hoses is defined by the side-plates and the upper and lower edges of the side-plates. The cross-sectional space is expanded by at least one of the cross-members being detachably mounted on the side-plates by connector parts (7). The cross-member is a bracket including bracket body (2) and a mounting member (6) at each free end of the body with a mounting member connector-part (8) for engagement by connector parts (7) which are engageable by movement of the mounting member connector-part in the lateral direction toward a plate connector part.

16 Claims, 17 Drawing Sheets

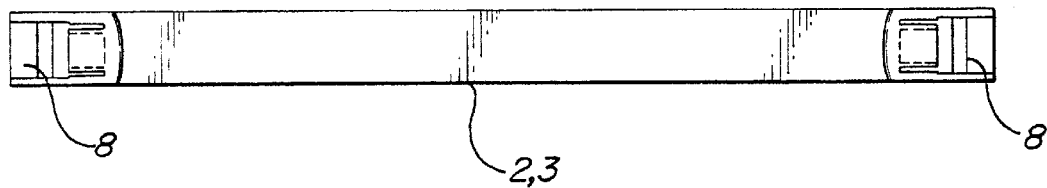
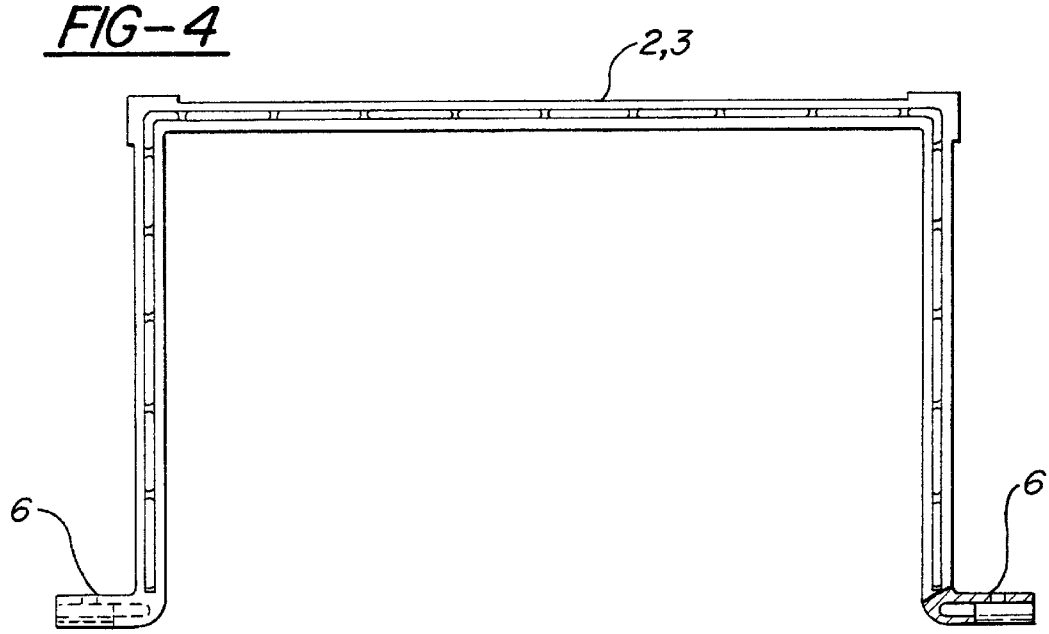

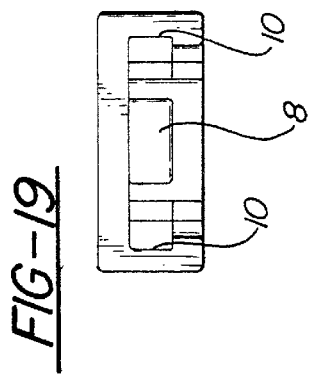
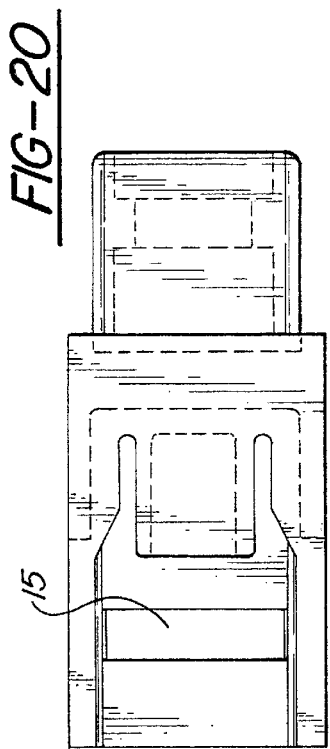
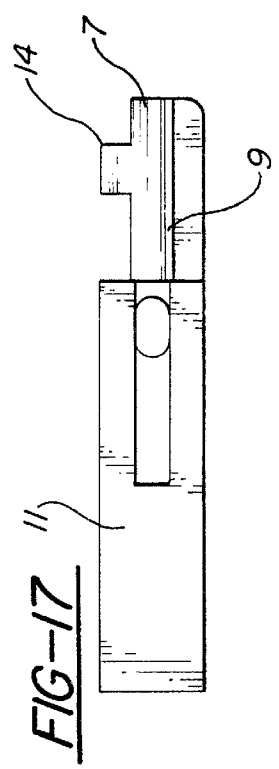
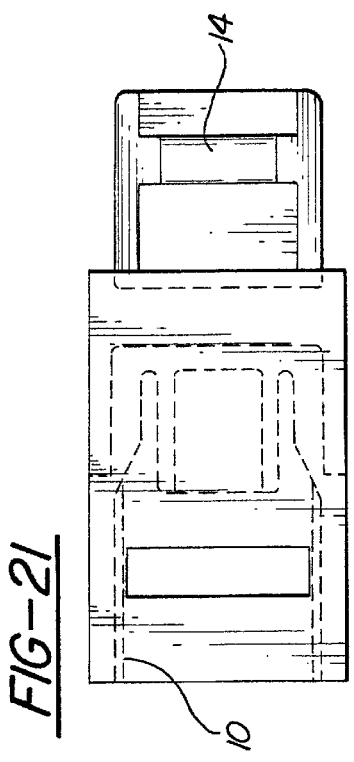
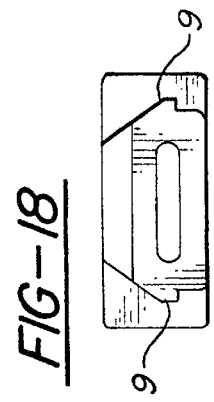

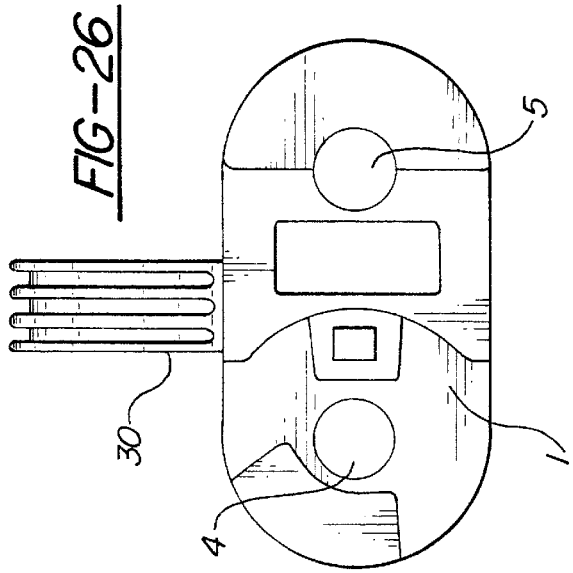
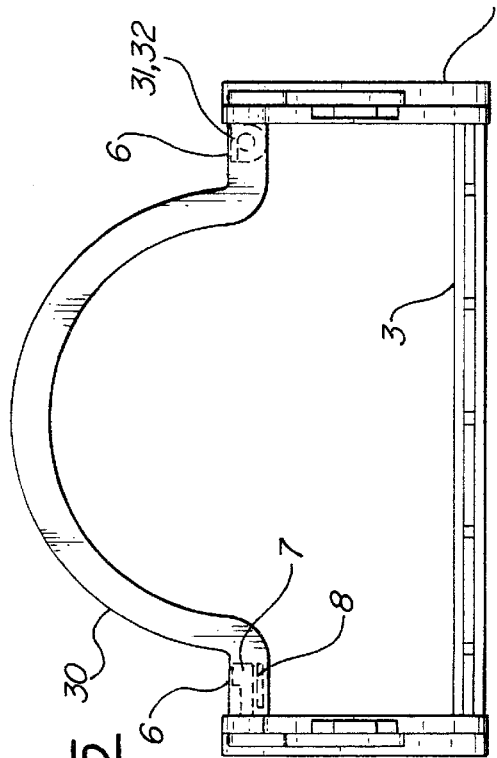
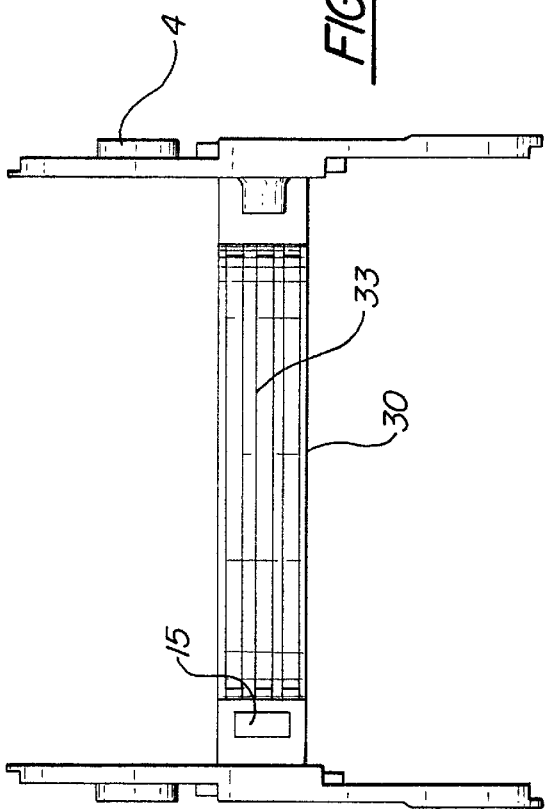

ENERGY-SUPPLY CHAIN

FIELD OF THE INVENTION

This Application is a 371 of PCT DE97/02863 filed Dec. 9, 1997

This invention relates to an energy guiding chain for accommodating cables, hoses and the like, having a number of chain links connected to one another in articulated fashion.

BACKGROUND OF THE INVENTION

In the prior art, energy guiding chains are known in which the chain links are formed by parallel side-plates or straps connected by cross-members, where the straps have lateral locking projections facing the inside of the chain for the detachable, snap-in accommodation of correspondingly designed cross-members or connectors. Energy guiding chains of this kind serve to guide cables, hoses and similar energy lines from one connecting point to another connecting point, where the position of at least one of the connecting points is variable.

An example of an energy guiding chain of the type described above is known from DE 35 31 066 A1 U.S. Pat. No. 4,513,224 granted Mar. 21, 1989. The energy guiding chain described there essentially consists of straps provided alternately with pins and circular bore holes, where the straps are connected to one another by way of detachable upper and lower cross-members to form a single chain link, where the pins of one chain link snap into the bore holes of the next chain link, so that the chain links can pivot relative to one another. in order to accommodate the detachable upper and lower cross-members, the straps are provided with inward-pointing projections or snap pins, which snap into recesses of the cross-members. The cross-members are easily and captively connected to the straps by being snapped onto the snap pins of the straps. Due, in particular, to the fact that the straps which respectively make up a single chain link are of mirror-image design with respect to one another, and that the upper and lower cross-members are identical, the known energy guiding chain is simple to manufacture and easy to assemble.

Another similar energy guiding chain is known from German Patent DE 39 09 797. This energy guiding chain also consists of similar parallel straps which can pivot relative to one another, which are connected to one another by way of detachable upper and lower cross-members, where the ends of the cross-members are attached in a detachable manner to straps positioned at the same height. In the case of this known energy guiding chain, the centre region of each chain strap is provided on both sides of the middle longitudinal plane of the chain strap with upper and lower projections, each of which having a T-shaped groove for accommodating the correspondingly shaped ends of the cross-members. The ends of the cross-members are of T-shaped design and can be inserted from the side into the grooves formed by the projections.

In order to increase the effective cross-section of the chain, German Patent DE 39 09 797 proposes retrofittable, oblong adapters, which can be inserted in pairs into the T-shaped grooves of two straps positioned at the same height and which accommodate cross-members in between having the same design and the same fastening elements as the chain cross-members of the straps. These adapters are seated with one wall on the upper or lower edge of the straps and thus form an extension of the middle longitudinal plane of the straps. Consequently, only a two-strap chain is required, to which elements can be attached using the adapters to accommodate cables in addition to the cables or lines of this chain, so that the effective cross-section and thus the capacity of the chain can be substantially increased, where cross-members of identical design can always be used.

The solution proposed in German Patent DE 39 09 797 may have the advantage that cross-members of identical design can always be used, but it involves the disadvantage that the assembly of the elements which increase the effective cross-section of the chain is very complicated. Each adapter must always be mounted on each strap individually, which means that, if necessary, a total of four adapters must be mounted on each chain link and, in addition, one or more cross-members must be mounted in between them. Since the cross-members are inserted into T-shaped grooves extending in the longitudinal direction of the chain, it is complicated to subsequently open the energy guiding chain in order to insert or remove cables. For example, if several cross-members are mounted one above the other as separators in order to partition the inside of the expanded cross-section or the original chain cross-section, the chain must virtually be disassembled entirely in order to insert cables into the chain cross-section bounded by the actual straps.

Furthermore, in the design described above, the width of the expanded cross-section is predefined by the distance between the straps defining the width of the chain. For example, this makes it impossible to construct an expanded cross-section which is offset or asymmetrical in relation to the original chain cross-section defined by the straps.

In addition, the existence of only two different types of parts, namely adapters and cross-members, permits only a few design alternatives as regards the construction and partitioning of the expanded cross-section.

However, the most serious disadvantage of the known chain is the fact that it is more difficult to subsequently open the chain in order to insert or remove cables.

A tubular, virtually completely closed energy guiding chain is known from U.S. Pat. No. 3,779,003 granted Dec. 18, 1973, for example, whose links consist of a U-shaped base and a U-shaped cover which fits over the base. The U-shaped covers are provided with snap tabs, which fit over the sides of the base forming the respective chain link and snap into corresponding recesses. The covers described in U.S. Pat. No. 3,779,003 form a closed, tubular energy guiding chain such that the pivotal axes of the individual links are positioned below the middle longitudinal plane of the cable guide in order to permit a certain degree of sag. This results in the asymmetrical shape of the individual chain link or chain cross-section in relation to the pivotal axis of the links. The effective cross-section of the chain is not intended to be expanded in this way. The effective cross-section of the chain described there is defined, and the ratio of the height of the sides of the chain links to the height of the covers is defined by the desired sag of the chain. German Patent DE 37 30 586 C1 describes the use of multi-part cross-members for an energy guiding chain, where the cross-members exhibit a centre section of adjustable length, in order to design the width of the interior space for the energy lines in such a way that it can be adapted to the thickness of the inserted energy lines. The cross-members are adjusted by cutting profile sections of the respective cross-members to the desired length. In this case, the effective cross-section is only expanded in terms of the width of the chain, where adjusting the chain in this way is very complicated and virtually irreversible if no additional material is used.

SUMMARY OF THE INVENTION

This invention is based on the need for increasing the effective cross-section of an energy guiding chain using the simplest possible means and retaining the configuration and design of the straps, where the advantage of easy opening and closing afforded by this type of chain is to be preserved and where the disadvantages described above are largely to be avoided.

According to this invention, the need is satisfied in that at least some of the cross-members are designed as brackets, where at least one side of the bracket forms an extension of the cross-section bounded by the parallel upper and lower edges of the straps, and in that the brackets are provided with mounting surfaces extending roughly parallel to the upper and lower narrow sides of the straps and having recesses corresponding to the locking projections of the straps.

Thus, the invention departs from the principle of always using cross-members of identical design in favour of a considerably simpler design. The use of brackets which expand the cross-section affords, in particular, the greatest possible freedom in designing the shape of the expanded cross-section, regardless of the width of the energy guiding chain defined by the distance between the straps.

The brackets according to the invention can be round or also angular, these being easier to assemble than pairs of adapters mounted at the same height as the straps, between which additional cross-members can be inserted. In particular, the brackets can, if necessary, be designed to fold open in the interior partitions provided.

The fact that the brackets are provided with mounting surfaces that extend roughly parallel to the upper and lower narrow sides of the straps and have recesses corresponding to the locking projections of the straps, ensures that the brackets can be snapped onto the locking projections on the straps on one or both sides of the chain in place of the otherwise standard cross-members. In this context, the mounting surfaces of the brackets are expediently designed in accordance with the mounting areas of conventional cross-members, so that the cross-members of a standard chain can be replaced as needed with the brackets according to the invention.

The brackets are preferably designed as elements which form a rectangular expanded cross-section. This permits the use of known guide channels provided with slide rails in the channels, in which the energy guiding chains can be rolled up and unrolled with their expanded cross-sections formed by the brackets. Since the width of the brackets forming the expanded cross-section is independent of the width of the chain defined by the distance between the straps, a relatively wide energy guiding chain according to the invention can be used together with a narrow and shallow guide channel.

For this purpose, at least the outer corners of the brackets are expediently reinforced with slide and/or guide surfaces. These surfaces ensure the quiet and low-wear running of the energy guiding chain in a guide channel.

In a preferred configuration of the invention, the brackets are of multi-part design, so that they enable the construction of an expanded cross-section in the form of a higher-order modular system.

A modular structure of the expanded cross-section formed by the brackets is particularly possible if the width and/or height of the brackets can be changed using intermediate elements designed as adapters.

The adapters can at least partially resemble the configuration of the locking projections. For example, adapters having locking projections on both sides can be provided for varying the height of the brackets, where the elements comprising the bracket can be completely or partially designed in the manner of conventional cross-members. For example, the adapters can also be designed with angled ends as corner pieces or as T-shaped elements with three mounting surfaces, or also as cross-shaped elements with four mounting surfaces.

In a preferred configuration of the invention, the adapters have complementary snap-fitting elements, so that a standard bracket, for example, can be used for various chain widths.

In another advantageous configuration of the invention, the inward-pointing locking projections of one strap of a chain link are provided with bearing bores, which form a hinge with bearing journals provided on the brackets or adapters. The brackets can thus be swung open on the hinge after opening one of the snap connections, this greatly facilitating the insertion of cables and/or lines into the chain. In this context, the hinges are expediently designed such that the bearing journals can be unsnapped from the bearing bores when the brackets are swung open, thus ensuring easy removal of the brackets.

The brackets and/or straps are preferably provided with additional fastening elements in order to accommodate interior partitions.

In order to accommodate interior partitions, detachably mounted inserts which form locking projections can, for example, be provided as fastening elements, which can be inserted into the corresponding recesses of the brackets and/or straps. For example, fastening elements of this kind enable cross-members to be inserted simply as cable-bearing separators in the brackets forming the expanded cross-section, or between the straps of the energy guiding chain.

If the brackets are heavily loaded due to separators or other cable or hose-bearing interior partitions, it may be expedient to provide the brackets with support legs resting respectively on the cross-member opposite the bracket.

Separate support members can be provided as an alternative, either supporting the brackets against the respective opposite cross-member or supporting opposite brackets of a chain link against each other.

The locking projections can be designed as the known snap ridges, which interact with the known complementary recesses.

In an alternative practical example of the invention, the brackets are designed as one-piece arches which form a tunnel-shaped expanded cross-section.

The invention also relates to an intermediate element designed as an adapter for use with an energy guiding chain with the characteristics described above, which essentially consists of a web-like element provided on both sides with snap-fitting elements designed to be either complementary or identical.

If the intermediate element is intended to be used to vary the height of the brackets, locking projections are expediently provided as snap-fitting elements on both sides of the web-like element.

In one configuration of the invention, the intermediate element is designed as a corner piece with mounting surfaces extending at roughly right angles to one another.

Lastly, the invention relates to an insert designed as a locking projection for use with an energy guiding chain with the characteristics described above, which consists of a basic element designed as a known locking projection and an integrated snap-in insert for insertion into a correspondingly shaped recess of a bracket and/or strap. For example, an insert of this kind enables separators to be inserted into the energy guiding chain in virtually any desired position, where conventional cross-members can be used as separators.

The snap-in insert is preferably designed as a pin.

Practical examples of the invention are described below on the basis of the drawings.

DESCRIPTION OF THE DRAWINGS

A complete understanding of this invention may be obtained from the description that follows taken with the accompanying drawings of various embodiments of the invention.

The drawings show the following.

BEST MODE FOR CARRYING OUT THE INVENTION

Figure 1:
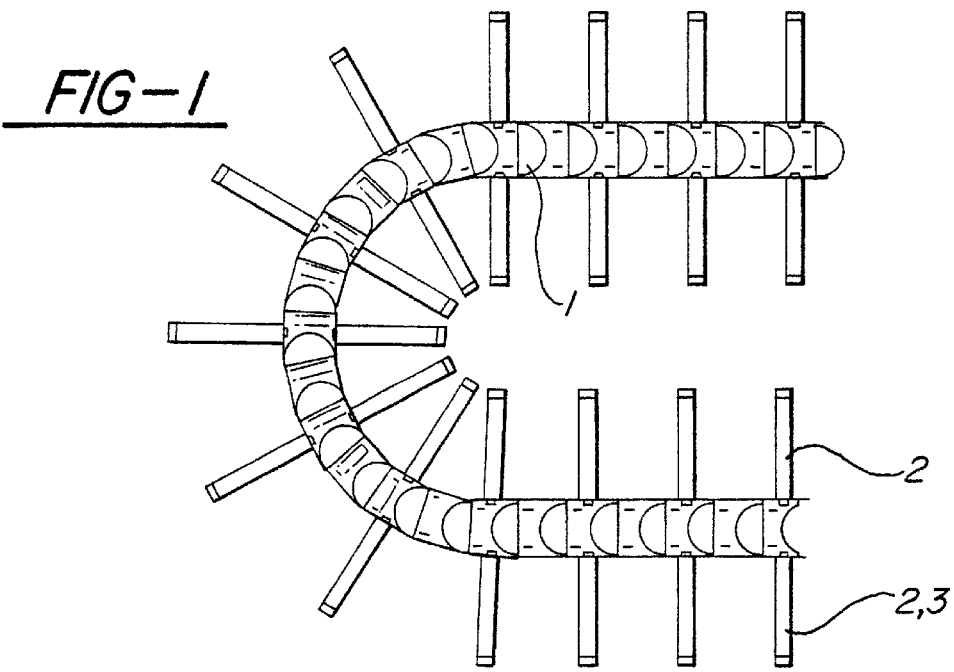
FIG. 1 a practical example of an energy guiding chain according to the invention, with brackets mounted above and below the chain which, on both sides of the chain, form an expansion of the chain cross-section bounded by the upper and lower edges of the straps, FIG. 2 an energy guiding chain according to the invention, which is provided with brackets on one side only, where the brackets extend between the upper and lower strand of the chain, FIG. 3 an energy guiding chain according to the invention, which is fitted with expansion brackets on one side, where the brackets bear the chain when unrolled, FIG. 4 a side view and partial sectional view of a bracket FIG. 5 a top view of the bracket illustrated in FIG. 4, FIG. 6 a bottom view of the bracket illustrated in FIG. 4, FIG. 7 the front view of a chain link of an energy guiding chain according to the invention pursuant to a first practical example, FIG. 8 a second practical example of an energy guiding chain according to the invention, FIG. 9 the energy guiding chain from FIG. 8 with interior partitions and support elements, FIG. 10 the energy guiding chain from FIG. 9 with additional interior partitions, FIG. 11 another version of the energy guiding chain according to the invention, FIG. 12 an energy guiding chain with a bracket provided with support legs, FIGS. 13 and 14 two versions of the energy guiding chain with the effective cross-section expanded on both sides, FIG. 15 an energy guiding chain according to the invention with a bracket of variable height, FIG. 16 a schematic view illustrating the movement of the energy guiding chain in a guide channel, FIG. 17 a side view of an intermediate element according to the invention, FIG. 18 the intermediate element from FIG. 17 viewed from the right in FIG. 17, FIG. 19 the intermediate element from FIG. 17 viewed from the left in FIG. 17, FIG. 20 a bottom view of the intermediate element from FIG. 17, FIG. 21 a top view of the intermediate element shown in FIG. 17, FIG. 22 a side view of an insert designed as a locking projection, FIG. 23 a left-hand side view of the insert shown in FIG. 22, and FIG. 24 a top view of the insert shown in FIG. 22, FIG. 25 a front view of a chain link of the energy guiding chain with a bracket designed as a one-piece arch, FIG. 26 a side view of the chain link illustrated in FIG. 25, FIG. 27 a top view of the chain link illustrated in FIG. 26, FIGS. 28 to 31 views of various configurations of adapters, and FIG. 32 a version of an energy guiding chain with the effective cross-section expanded on one side by using the adapters shown in FIGS. 28 to 31.
Figure 2:
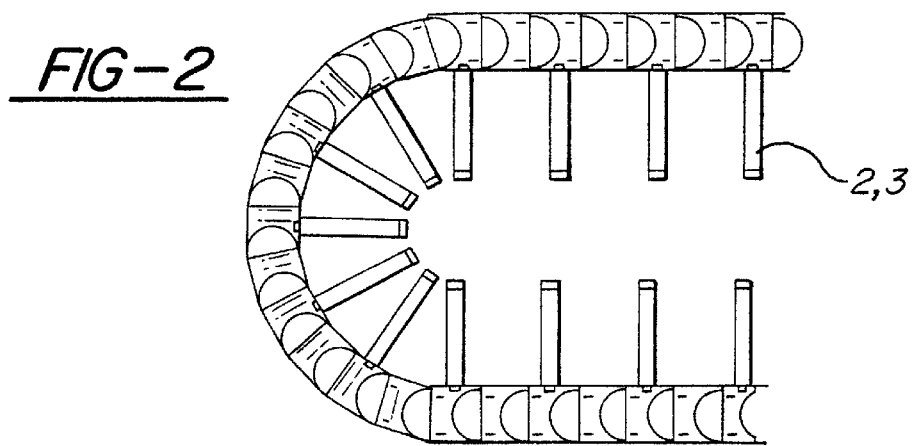
Figure 3:
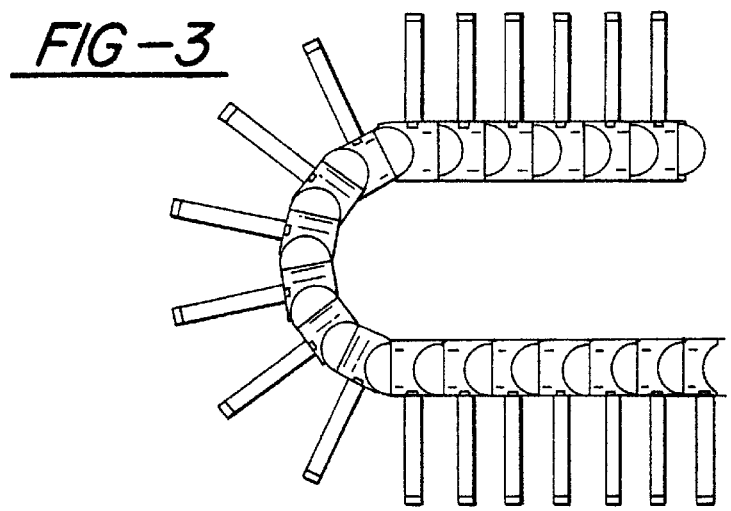

Referring now to the drawings, several preferred embodiments of the invention will be described. It will be appreciated, as the description proceeds, that the invention may be used in many applications and may be realized in a wide variety of other embodiments.

As shown in FIGS. 27 and FIGS. 1 to 3 in particular, the energy guiding chain according to the invention consists of chain links assembled to form a chain strand preferably bendable in one direction. The chain links consist of straps 1 of mirror-image design positioned parallel to one another and connected by upper and lower cross-members 2, 3. Straps 1 and upper and lower cross-members 2, 3 are injection-moulded from a thermoplastic material.

Straps 1 are cranked inward relative to one another on one side of the chain link and each is provided with an outwardly protruding cylindrical pin 4. The other sides of straps 1 are cranked outward relative to one another and each is provided with a bore hole 5 dimensioned in accordance with pin 4. In place of bore hole 5, the inside of the outwardly cranked region of each of the straps can also be provided with a cylindrical recess. Cylindrical pins 4 on the outside of the inwardly cranked strap sections engage bore holes 5 of the outwardly cranked strap sections of the adjacent chain link, so that an energy guiding chain is formed by two parallel strap strands which can bend in at least one direction.

It is evident to a person skilled in the art that straps 1 need not necessarily be of cranked design. one of the two cross-members 2, 3 can be designed as an integral part of straps 1, although both upper cross-member 2 and lower cross-member 3 can be snap-fitted to straps 1 in detachable manner.

Upper and lower cross-members 2, 3 which connect straps 1 respectively form the upper and lower walls of the channel formed by the chain links for the accommodation of hoses, cables and the like.

Figure 7:
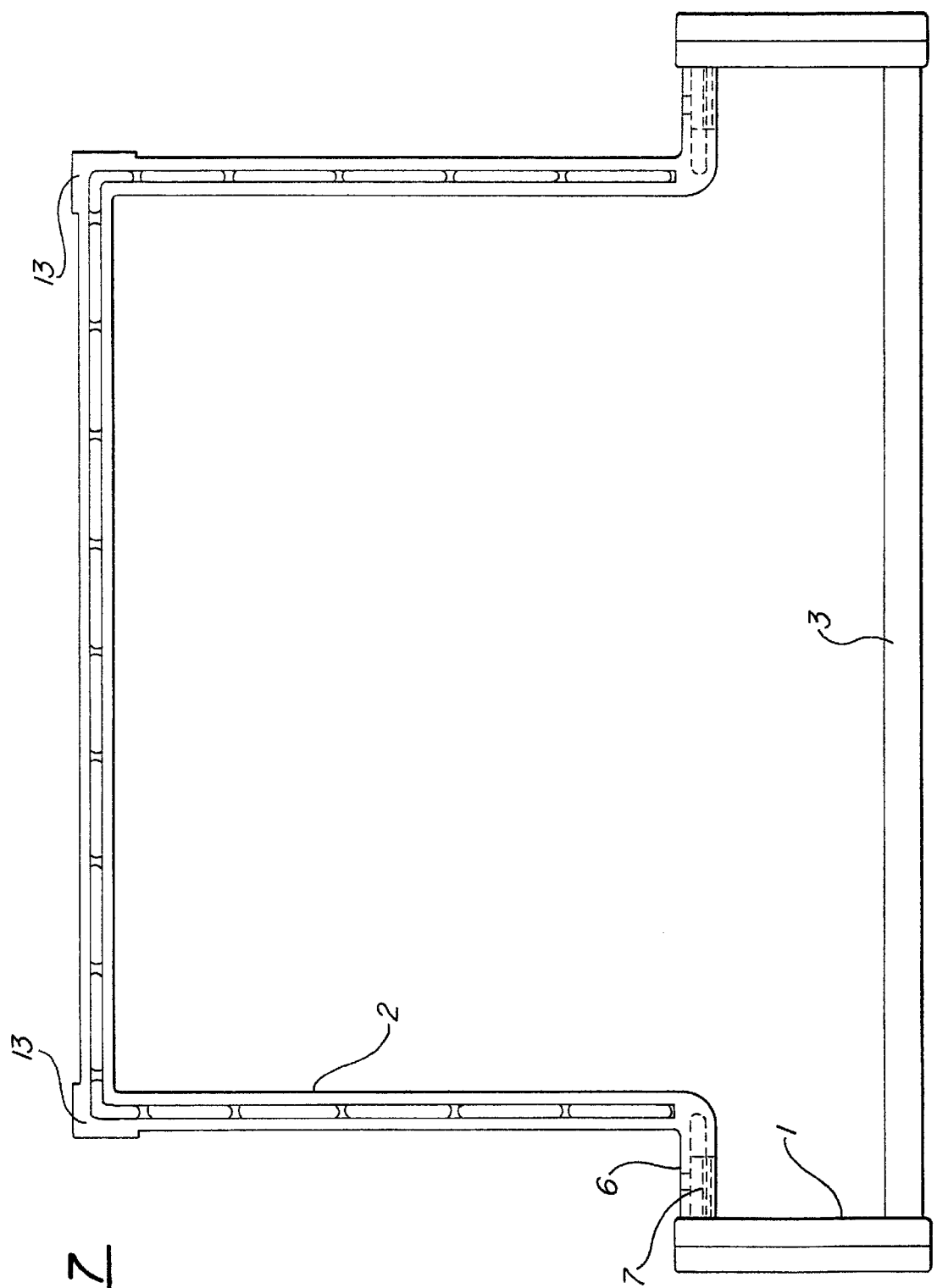

FIG. 7 shows a first practical example of the chain according to the invention, in which upper cross-member 2 is designed as a rectangular bracket with mounting surfaces 6 running parallel to lower cross-member 3. Both the upper and the lower cross-member 2, 3 are snap-fitted in detachable manner onto integrally moulded locking projections 7 provided on the inside of straps 1. Locking projections 7 are represented by the broken lines in FIG. 7, where only upper locking projections 7 are visible. As mentioned at the start, lower cross-member 3 can, for example, also be designed as an integral part of straps 1.

In FIGS. 4 to 6, upper cross-member 2, designed as a rectangular bracket, is shown separately. Mounting surfaces 6 of the rectangular bracket are designed in accordance with the mounting surfaces of the known cross-members and provided with recesses 8 corresponding to locking projections 7. The inward-pointing locking projections 7 of straps 1 are each designed in the known manner as projections having a trapezoidal cross-section and having bevelled snap ridges or undercut snap bevels 9 on both sides, these interacting with snap grooves provided in recesses 8 of the associated cross-member 2, 3.

The design of locking projections 7 and recesses 8 is described here on the basis of adapter 11 illustrated in FIGS. 17 to 21, which will be described below and whose configuration corresponds to that of locking projections 7 and recesses 8 provided on mounting surfaces 6 of cross-members 2, 3.

The figures clearly show that upper cross-member 2 designed as a rectangular bracket forms an upper expansion of the effective chain cross-section for the cables, hoses and the like. This upper cross-member 2 can be assembled, locked and detached in a simple manner.

Figure 16:
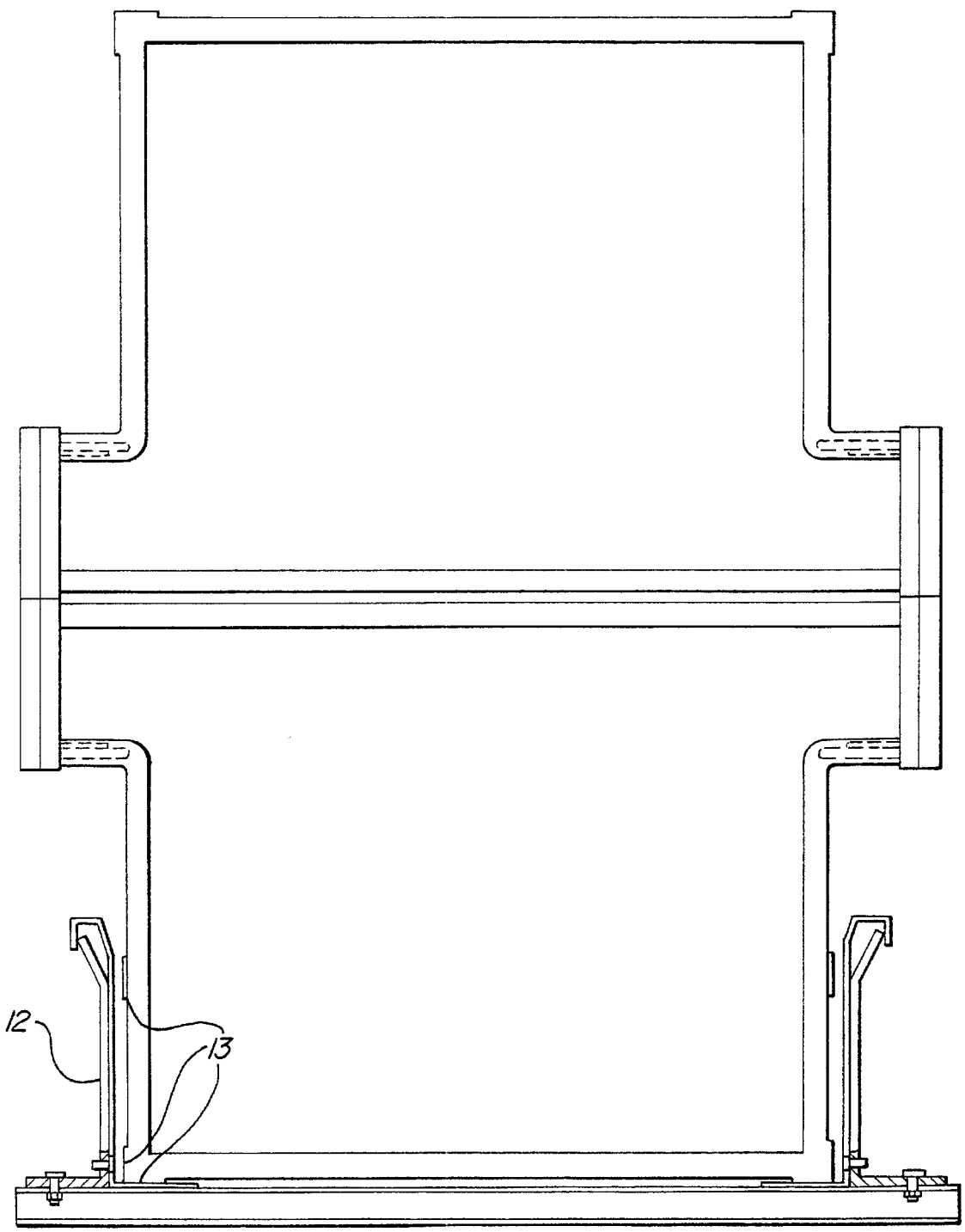

The rectangular shape of the bracket permits the use of a shallow, narrow guide channel 12 as a guide for the energy guiding chain, as illustrated in the example in FIG. 16. In order to ensure low-friction and quiet running of the energy guiding chain in the guide channel, the corners of the brackets are reinforced with additional slide surfaces or guide surfaces 13. As FIG. 16 shows, the vertical sides of the brackets can also be reinforced with similar guide surfaces 13.

Figure 8:
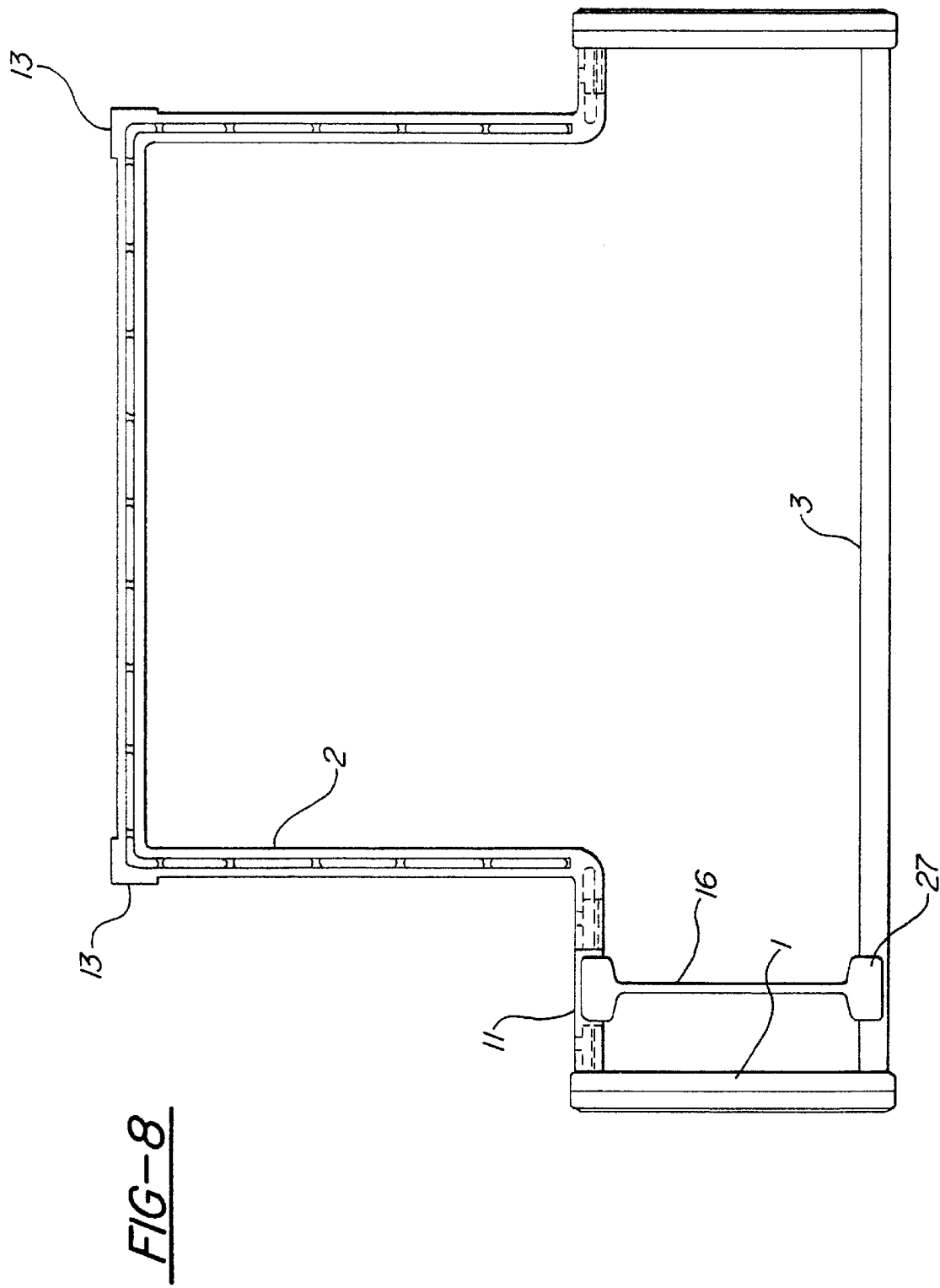

FIG. 8 shows a practical example of the energy guiding chain according to the invention, where the bracket is of multi-part design and the side shown on the left in FIG. 8 is widened by an adapter 11 designed as an intermediate element. The design of adapter 11 is illustrated in FIGS. 17 to 21. On the side shown on the left in FIGS. 17, 20 and 21, adapter 11 is provided with a recess which, as mentioned above, corresponds to recesses 8 of mounting surfaces 6 of upper and lower cross-members 2, 3. The right-hand side of adapter 11 is designed as a locking projection 7, whose design corresponds to the inward-pointing locking projections 7 of straps 1. As an extension of mounting surface 6 of a bracket, adapter 11 is snap-fitted to the bracket and locking projection 7 of a strap 1. A stud 14 is located on the top of locking projection 7 of the associated strap 1, or on the top side of adapter 11, which engages a window-like hole 15 on mounting surface 6 of the bracket or in the recess 8 of adapter 11. The snap-in connection between the respective locking projection 7 and recess 8 can be pried open using a screwdriver in the window like hole 15.

In the practical example illustrated in FIG. 8, a known divider 16 inserted between adapter 11 and lower cross-member 3 is provided in order to partition the effective cross-section of the energy guiding chain.

Figure 9:
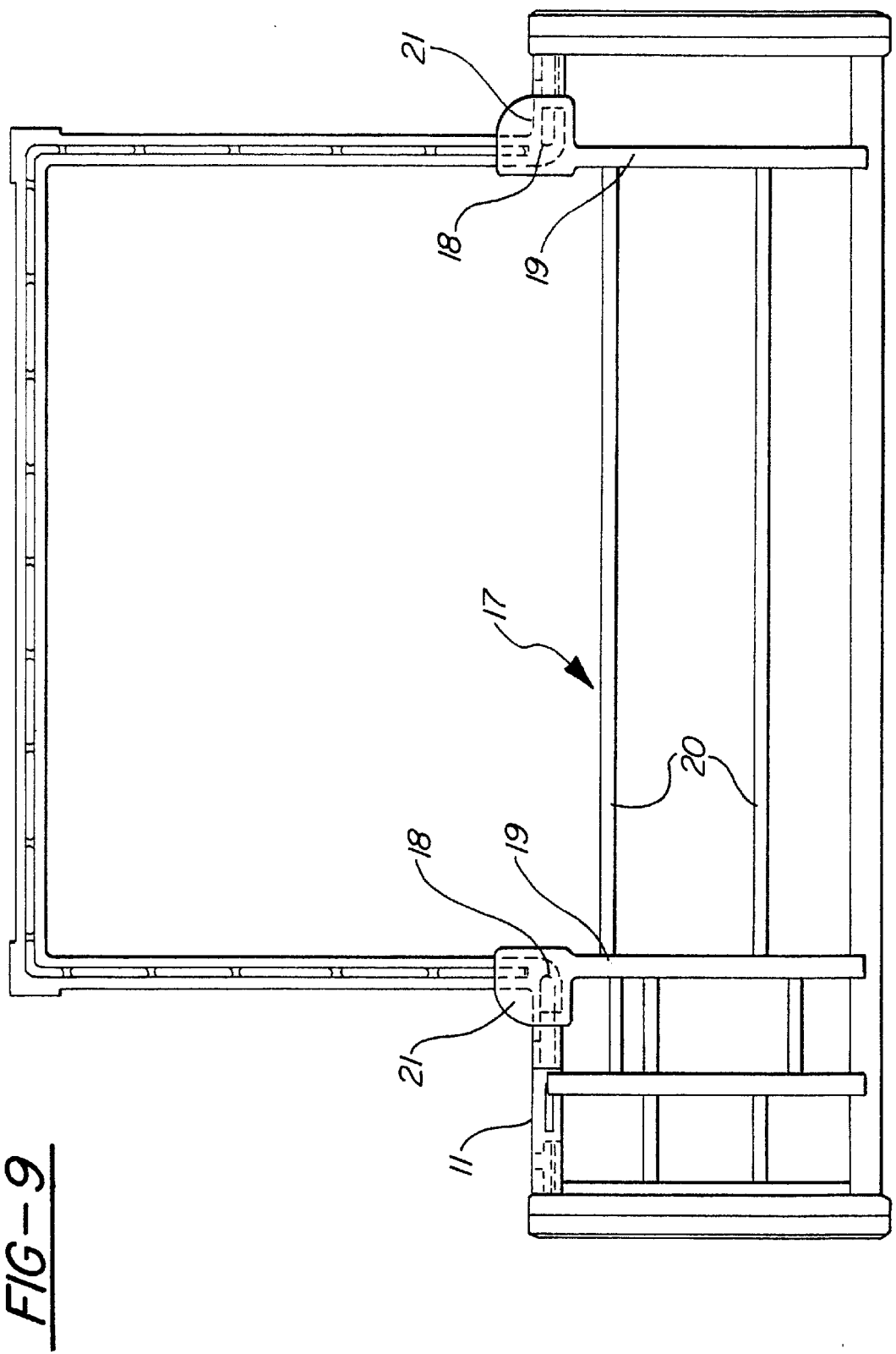

FIG. 9 shows another practical example of the energy guiding chain according to the invention, where the cross-section of the chain link is divided by additional interior partitions 17. The lower corners 18 of the bracket, angled towards the inside of the chain, are supported by separate support members 19 against the lower cross-member 3. In this context, support members 19 also serve to accommodate separators 20. On the ends facing the bracket, support members 19 are provided with angular supports 21, which accommodate the lower corners 18 of the brackets. These angular supports 21 can be provided with additional snap-fitting elements, into which the lower corners 18 of the brackets can be snapped.

Figure 10:
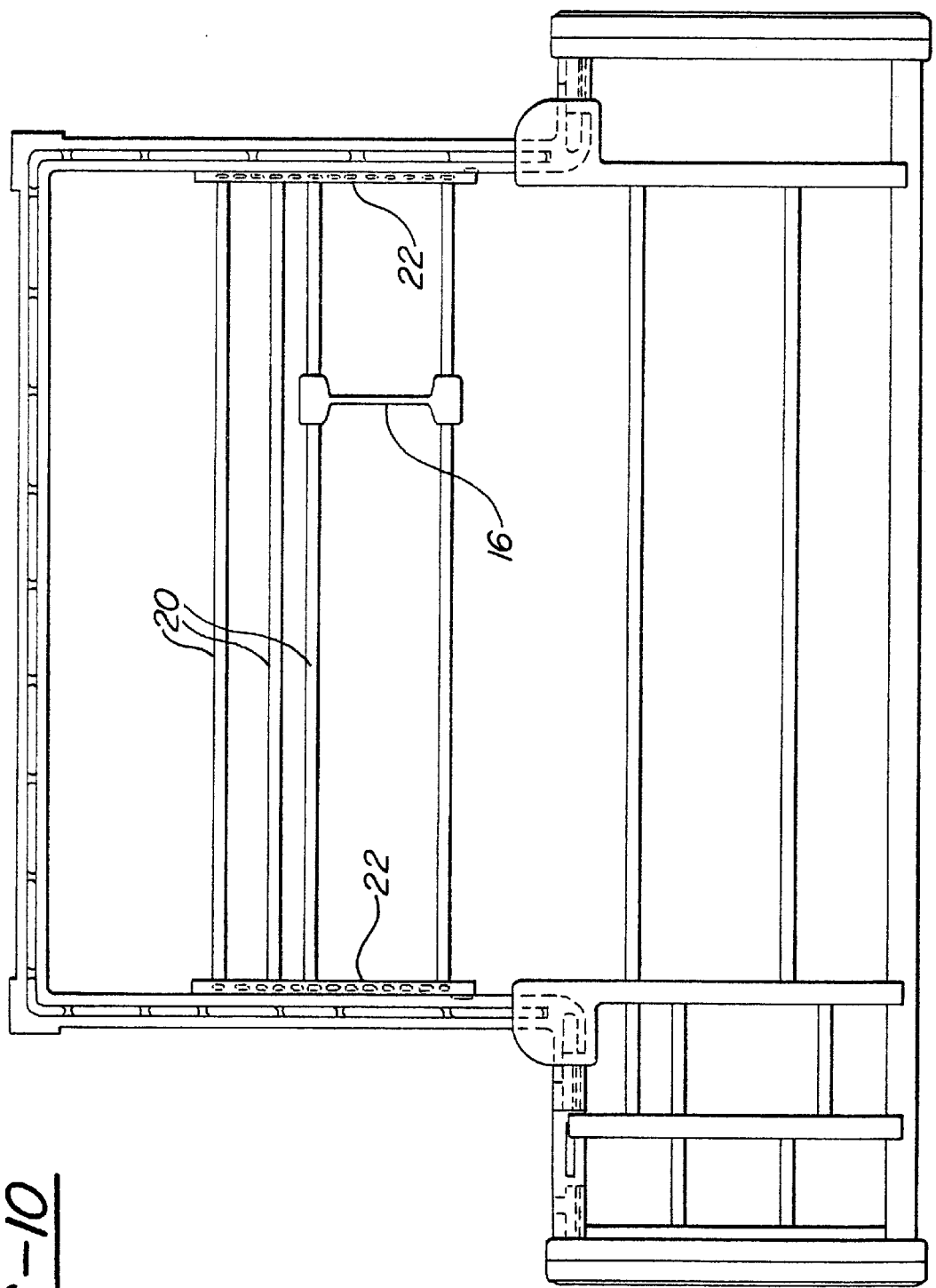

FIG. 10 shows the energy guiding chain illustrated in FIG. 9, where additional separators 20 are provided in the expanded cross-section formed by the bracket. Known side-plates 22 are attached to the inside of the bracket in order to fasten separators 20. The separators can be inserted into side plates 22 such that the height is variable. Dividers 16 can be inserted between the separators in order to further partition the expanded cross-section.

Figure 11:
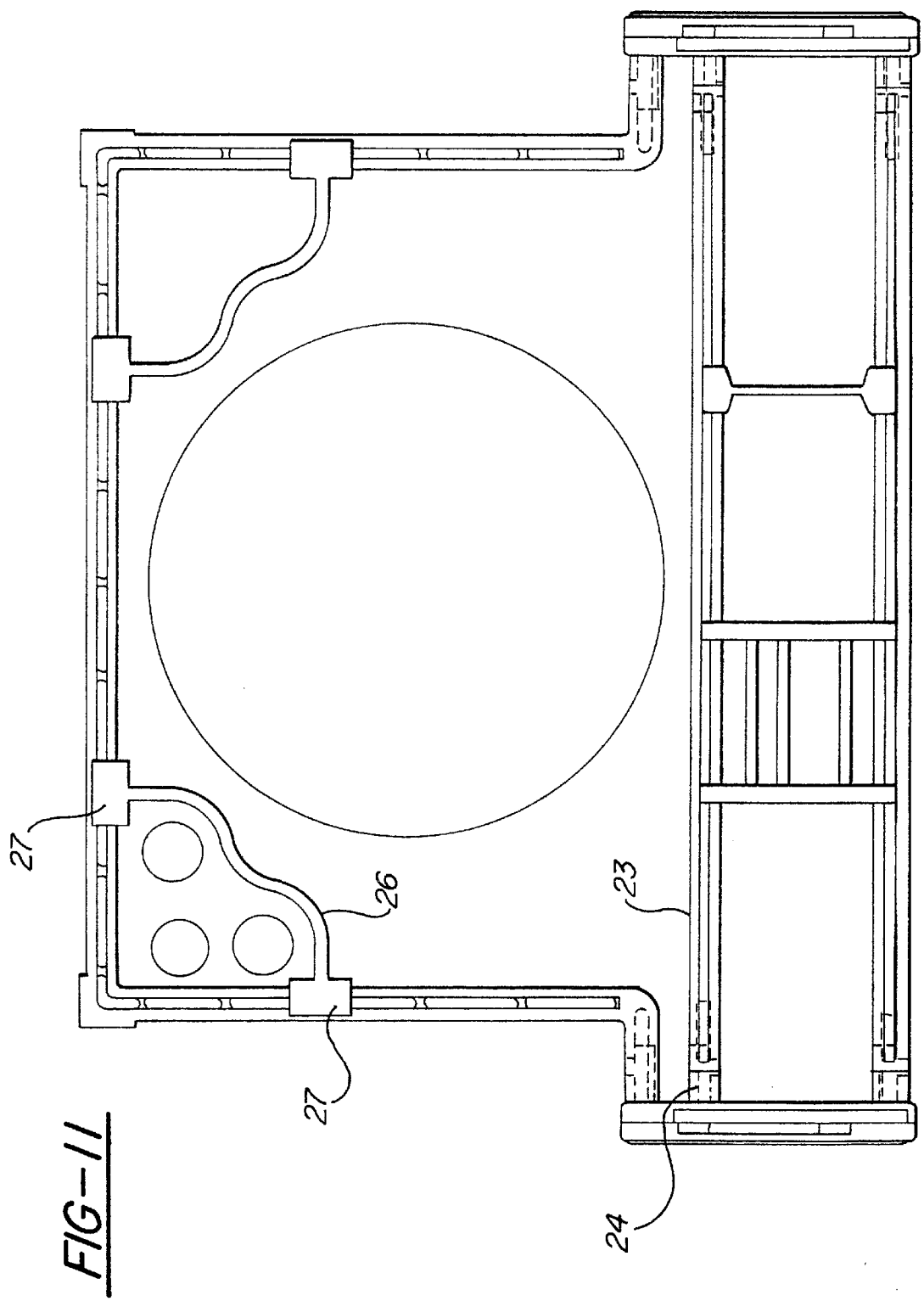
Figure 22:
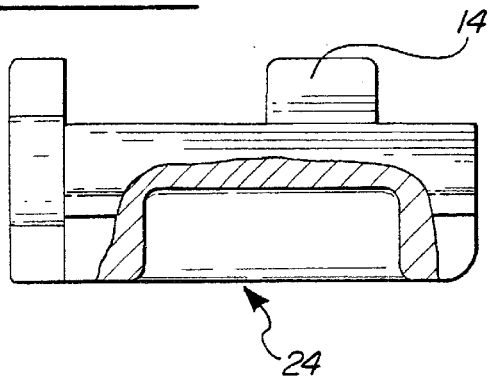
Figure 23:
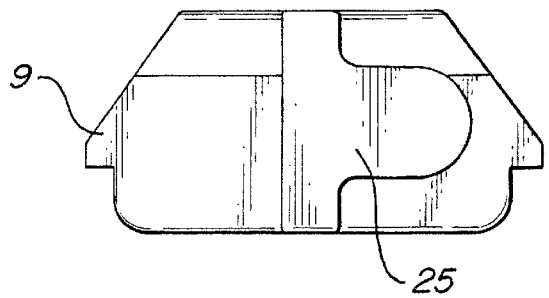
Figure 24:
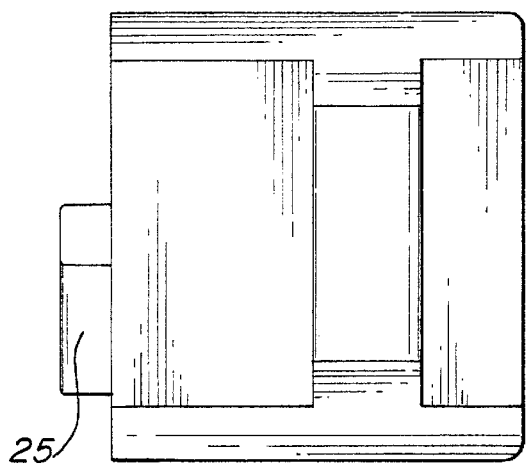

FIG. 11 shows another version of the energy guiding chain according to the invention in which an intermediate cross-member 23 is inserted between straps 1. Intermediate cross-member 23 is designed in the manner of a conventional cross-member, where additional locking projections are provided on the insides of the straps in order to accommodate intermediate cross-member 23. These locking projections are designed as detachably fitted inserts 24 and illustrated in FIGS. 22 to 24. The insert shown there is designed in the manner of a locking projection 7, where the insert is provided with a roughly T-shaped pin 25 which can be snapped into recesses (not shown) of straps 1 or the brackets.

In the practical example illustrated in FIG. 11, additional corner partitions 26, with which smaller cables or hoses can be secured in the corners of the brackets, are provided for optimum utilisation of the expanded cross-section. Corner partitions 26 and dividers 16 are provided with forked clamping elements 27, with which they can be snap-fitted to the brackets.

Figure 12:
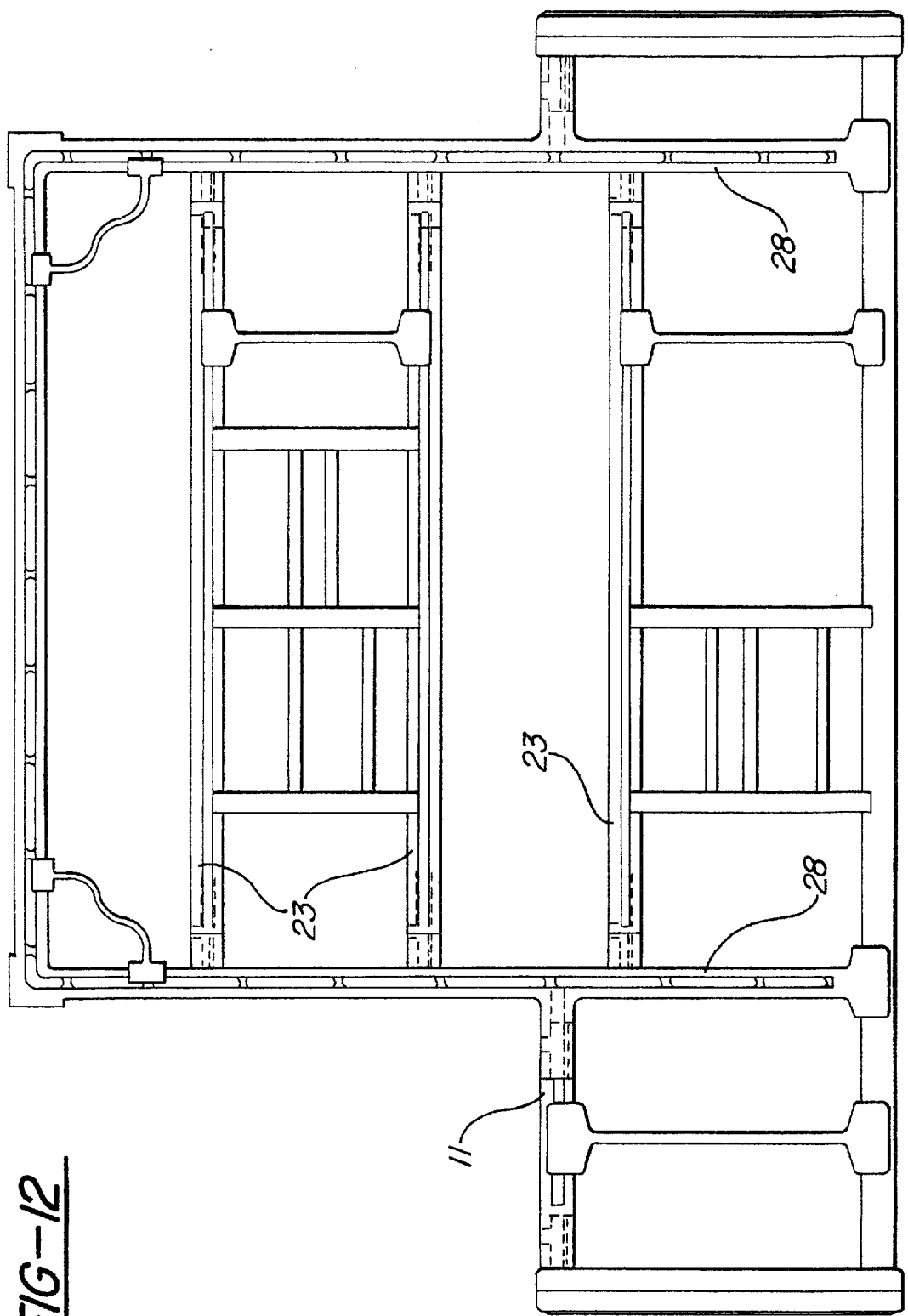

In the practical example shown in FIG. 12, intermediate cross-members 23 are mounted in the expanded cross-section formed by the brackets using inserts 24 described above. As the brackets are, by nature, under a heavy load due to the inserted intermediate cross-members 23 and the cables and/or hoses lying on top of them, they are supported by support legs 28 against lower cross-member 3. The bottom ends of the support legs are of a design similar to dividers 16.

Figure 13:
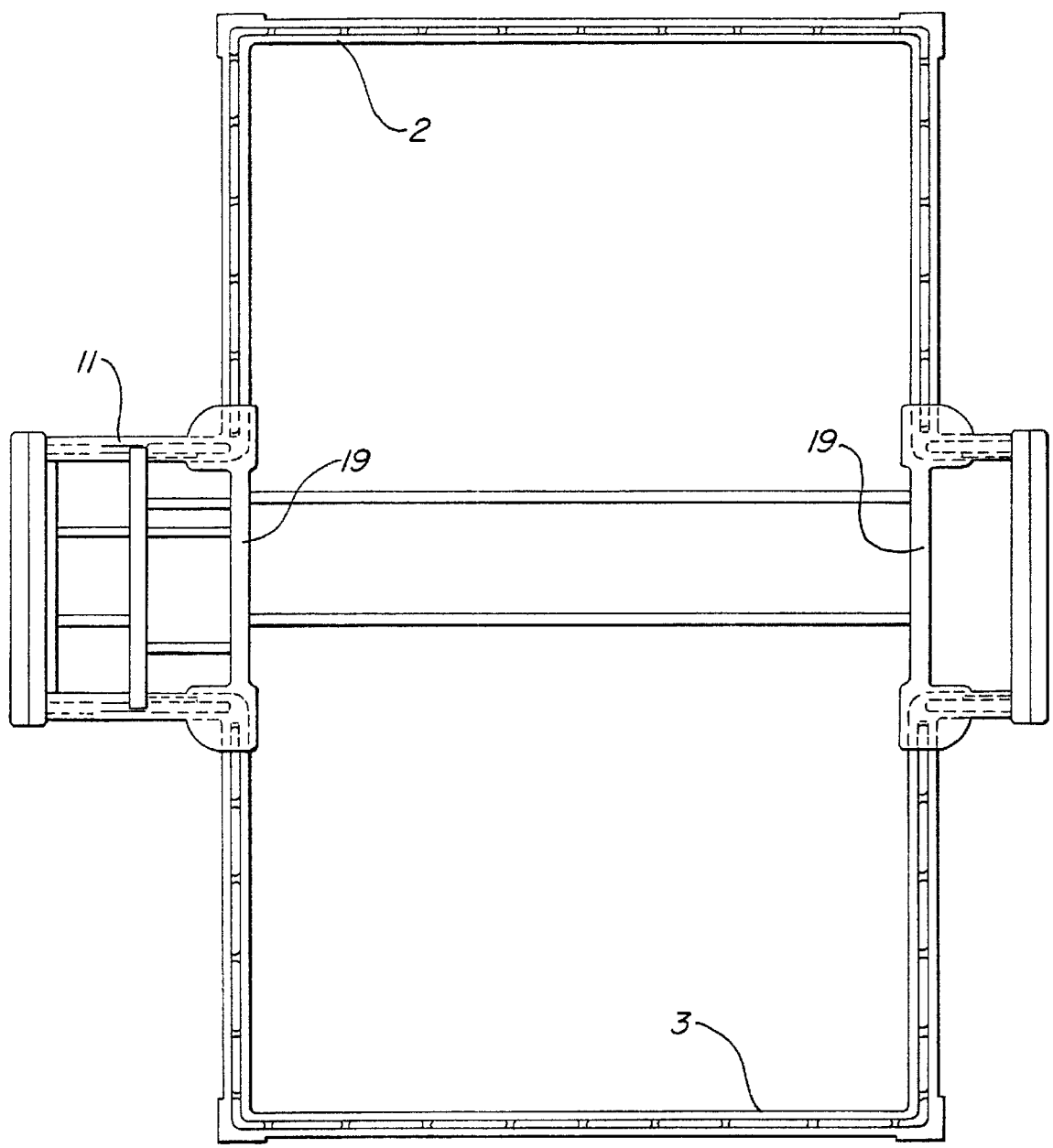

FIG. 13 shows a practical example of the energy guiding chain, where a cross-member designed as a bracket is provided in place of the standard design of lower cross-member 3. This expands the effective cross-section of the energy guiding chain both upwards and downwards. The inward-pointing corners 18 of the opposing brackets are supported against one another by means of support members 19 described above.

Figure 14:
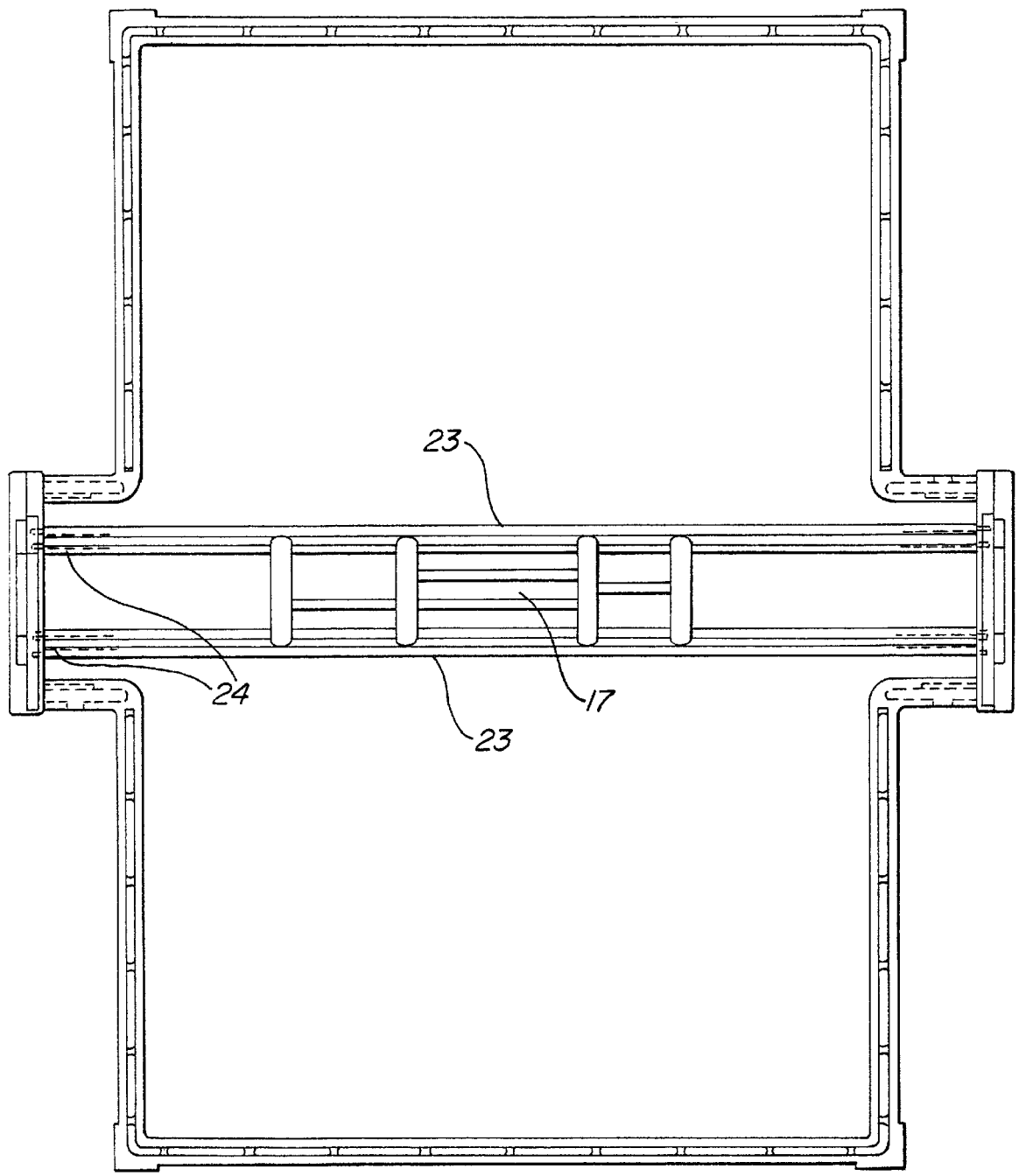

In the practical example illustrated in FIG. 14, the effective cross-section of the energy guiding chain is again expanded on both sides of the straps by means of rectangular brackets, where the straps are furthermore provided with additional interior partitions by intermediate cross-members 23.

Figure 15:
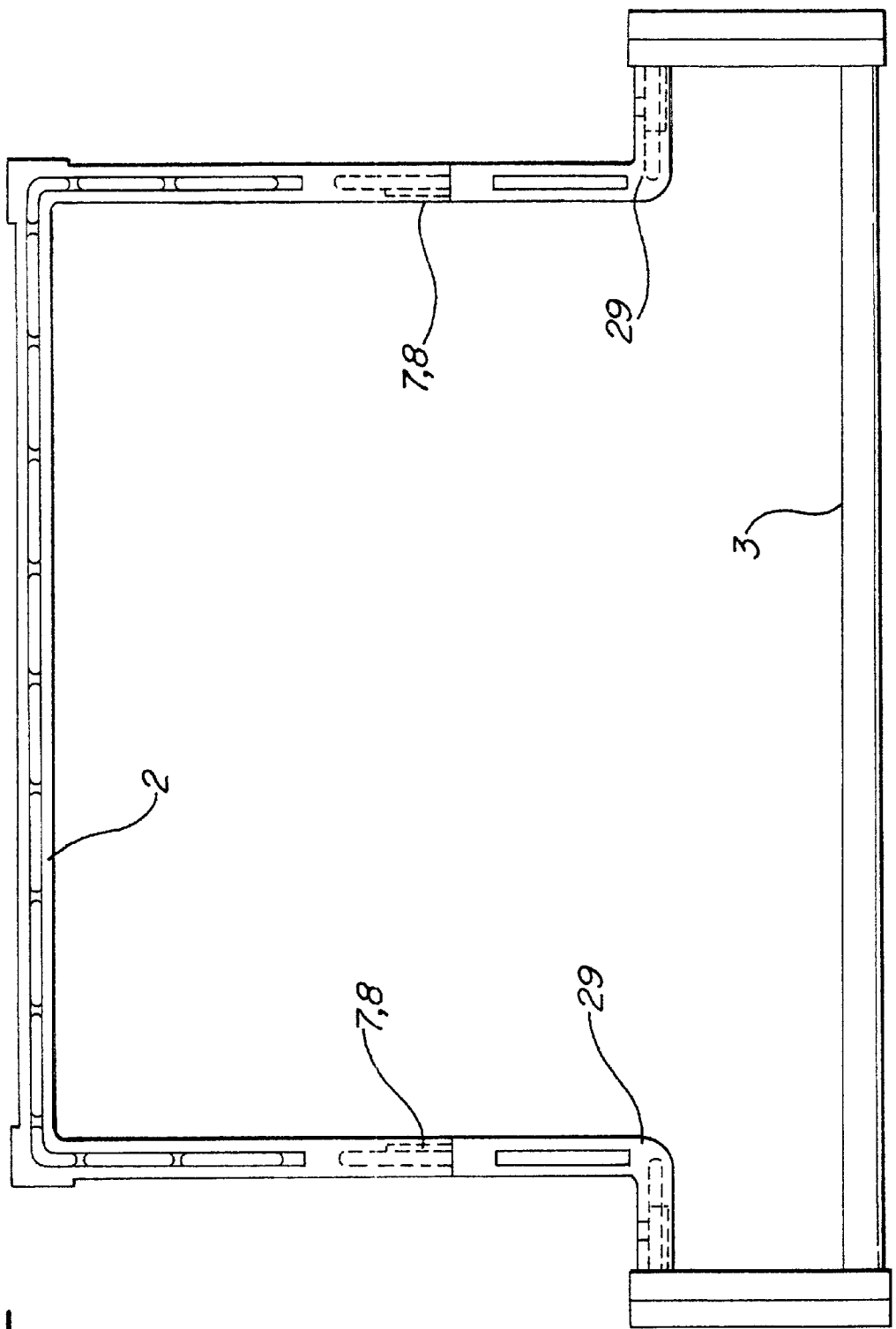

FIG. 15 shows an energy guiding chain with multi-part bracket of adjustable height, which is equipped with detachably mounted corner pieces 29. Corner pieces 29 are designed in the manner of adapter 11 illustrated in FIGS. 17 to 21. Mounting surfaces 6 of corner pieces 29, extending roughly parallel to the upper narrow sides of straps 1, are designed as recesses 8, whose vertical ends extending upwards are designed as locking projections 7. The height of the bracket illustrated in FIG. 15 can easily be varied using several straight adapters 11 or corner pieces 29 of different sizes.

The effective-cross-section of the energy guiding chain according to the invention can be expanded as needed in the manner of a higher-order modular system using adapters 11, inserts 24 and corner pieces 29, as well as the rectangular brackets.

Adapters 11 and the brackets can be provided with hinges, for example, which enable the energy guiding chain to be easily be folded opened.

FIGS. 25 to 27 illustrate a practical example of the invention, where the brackets forming upper cross-member 2 are designed as one-piece arches 30. These arches 30 enable a particularly simple and stable version of the energy guiding chain according to the invention.

As shown in FIG. 25, the right-hand side of the bracket is pivot-mounted via bearing journals 31 in bearing bores 32 of the associated locking projection. When the bracket is in the open position, bearing journals 31 can easily be snapped out of bearing bores 32.

For reasons of stability, arches 30 are provided with reinforcing ribs 33 running in the circumferential direction.

Figure 28:
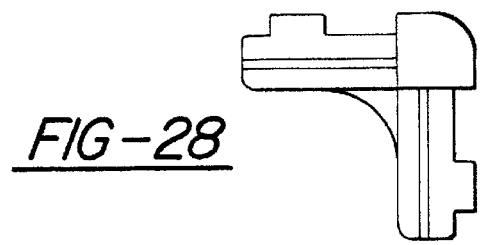

FIGS. 28 to 31 show different versions of adapters 11, where FIG. 28 shows a corner pieces 29, for example, whose mounting surfaces 6 are both designed as locking projections 7 in the manner of locking projections 7 of chain straps 1.

Figure 29:
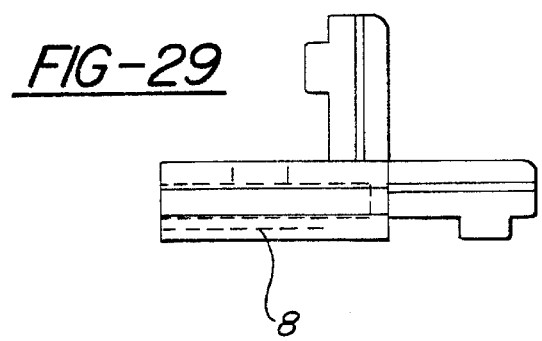
Figure 30:
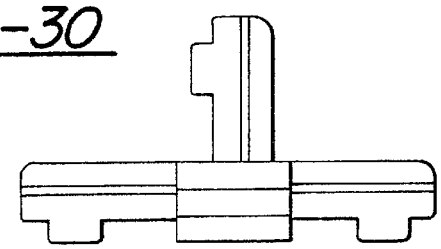
Figure 31:
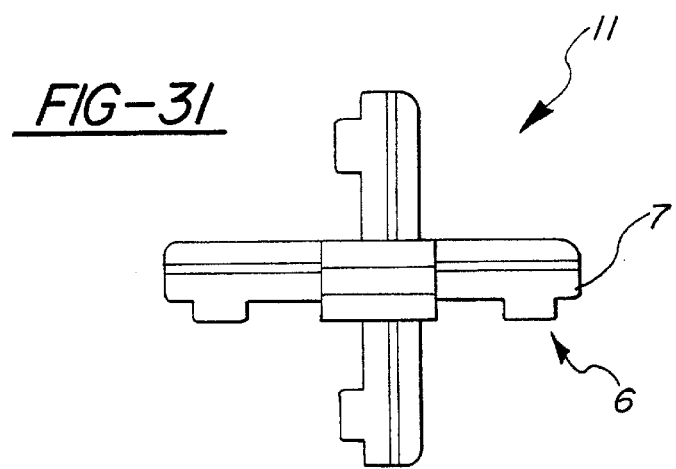
Figure 32:
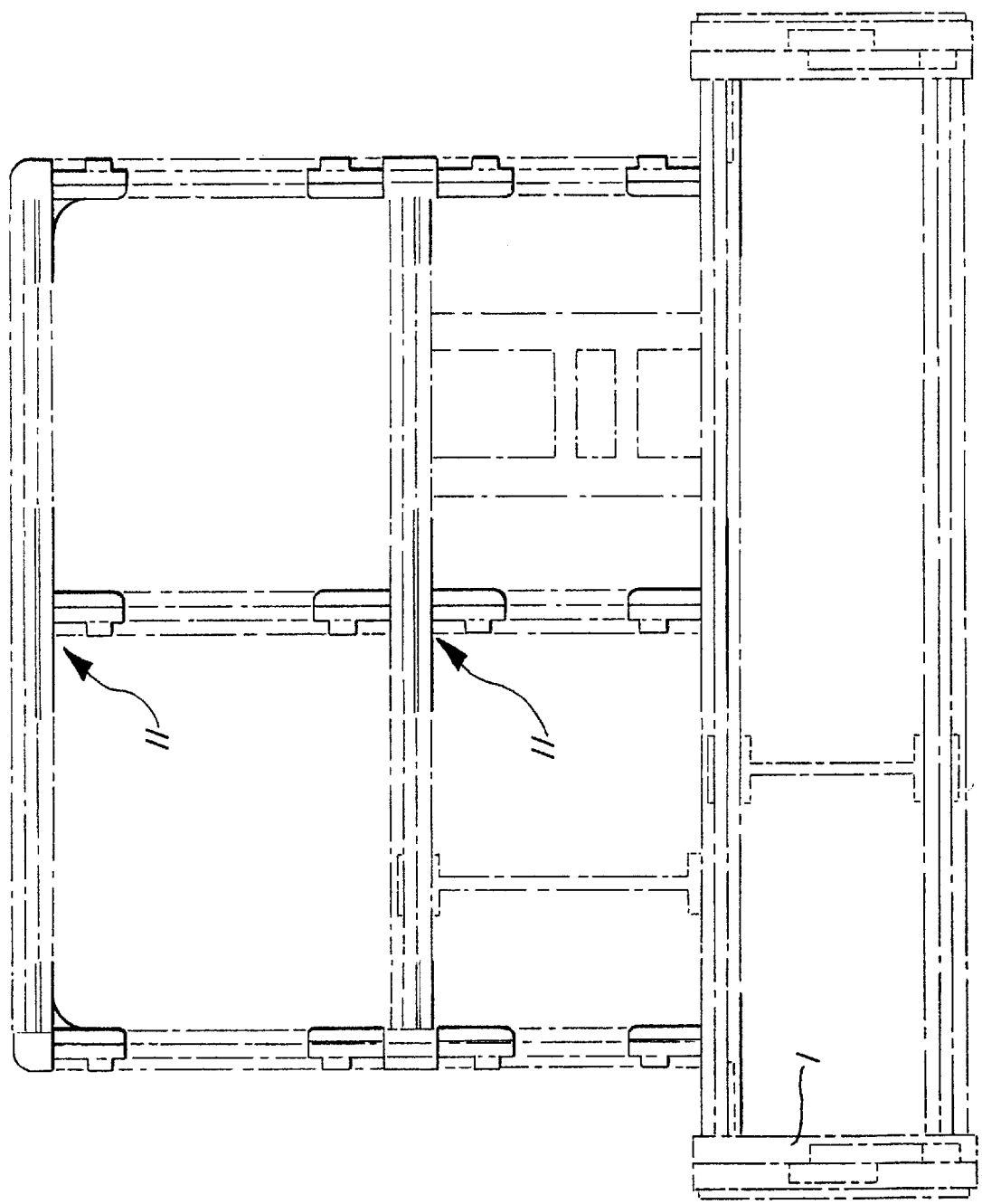

FIG. 29 shows an adapter 11, which is of roughly T-shaped design, where two mounting surfaces 6 are provided with locking projections 7 and one mounting surface with recesses 8. The adapter 11 illustrated in FIG. 30 is also of T-shaped design, where all three mounting surfaces 6 are equipped with locking projections 7. Finally, FIG. 31 shows a cross or star-shaped adapter 11, which is provided with four identically designed mounting surfaces 6 as locking projections 7. FIG. 32 illustrates the various uses of adapters 11 shown in FIGS. 28 to 31.

Although the description of this invention has been given with reference to particular embodiments, it is not to be construed in a limiting sense. Many variations and modifications will now occur to those skilled in the art. For a definition of the invention, reference is made to the appended claims.

What is claimed is:

1. In an energy guiding chain for accommodating cables and hoses, said chain having a plurality of chain links connected to one another in an articulated arrangement, each of said chain links comprising first and second laterally spaced parallel side-plates (1) with upper and lower cross-members (2,3) connected therebetween, said side-plates defining a cross-sectional space therebetween for said cables and hoses, said cross-sectional space being bounded by the upper and lower edges of said side-plates, at least one of said cross-members being detachably mounted on said side-plates, said first and second side-plates having first and second plate connector-parts (7), respectively, for each of said cross-members, said first and second plate connector-parts disposed opposite each other, the improvement wherein:

said one cross-member comprises a bracket having a bracket body (2) terminating at one end in a first mounting member (6) and terminating at the other end in a second mounting member (6), each mounting member having a mounting member connector-part (8), the mounting member connector-part (8) on the first mounting member being engaged with the plate connector-part on the first side-plate and the mounting member connector-part (8) on the second mounting member being engaged with the plate connector-part on the second side-plate, each of said mounting member connector-parts (8) being engageable with its respective plate connector-part by insertion of one into the other by movement of the mounting member connector-part in the direction toward the plate connector-part, said bracket body (2) extending between said mounting members (6) in a configuration which forms an extension of said cross-sectional space and provides increased effective cross-sectional space of the chain.

2. An energy guiding chain as defined in claim 1 wherein: said bracket body (2) is of channel-shape having two side elements and having a bottom element, each of said side elements extending from one of said mounting members (6) to one end of said bottom element, each end of the bottom element being joined with the adjacent side element by a corner.

3. An energy guiding chain as defined in claim 2 wherein: said bracket body (2) is rectangular.

4. An energy guiding chain as defined in claim 3 wherein: each of said corners includes one or more slide members (13) for engaging a guide channel during movement of said chain.

5. An energy guiding chain as defined in claim 3 wherein: a corner partition (26) extends diagonally between one of said side elements and said bottom element.

6. An energy guiding chain as defined in claim 1 wherein: said bracket body (2) is of arch-shape.

7. An energy guiding chain as defined in claim 1 wherein: said bracket body (2) is a unitary structure of molded plastic.

8. An energy guiding chain as defined in claim 1 wherein: said bracket body (2) comprises multiple parts connected together by interlocking joints.

9. An energy guiding chain as defined in claim 8 wherein: said bracket body (2) includes adapter means for extending the cross-sectional space of the bracket body.

10. An energy guiding chain as defined in claim 1 wherein:

said mounting member connector part on the first mounting member includes a bearing journal and the plate connector part on the first side plate is provided with a bearing bore, said bearing journal and bearing bore being mated to form a hinge whereby said bracket body can be pivoted to an open position for access to the space between said side plates.

11. An energy guiding chain as defined in claim 1 wherein:

said bracket body (2) is of channel-shape having two side elements and a bottom element, adapter means (11) connected with one of said mounting members (6) of said bracket, whereby the effective length of said one of said mounting members is made longer than the other mounting member.

12. An energy guiding chain as defined in claim 11 wherein:

a support member (19) extends parallel to said first side element and extends between said one mounting member and said other cross-member of said chain link.

13. An energy guiding chain as defined in claim 11 wherein:

said bracket includes at least one separator member (20) extending between said first side element and said second side element.

14. An energy guiding chain as defined in claim 13 including:

a second separator (20) extending between said first side element and said second side element, and a divider (16) extending between said separators (20) and being substantially parallel to said side-plates.

15. An energy guiding chain as defined in claim 1 including:

an intermediate cross-member disposed between said upper and lower cross-members and extending between said first and second side-plates.

16. An energy guiding chain as defined in claim 1 wherein:

at least one of said plate connector-parts (7) is a lateral locking projection facing the inside of the chain and the corresponding mounting member connector-part (8) is a recess in the end of its associated mounting member (6).

* * * * *